US012754167B2

(12) United States Patent
Stewart

(10) Patent No.: US 12,754,167 B2
(45) Date of Patent: Oct. 6, 2026

(54) MAGNETIC ULTRASOUND TESTING SYSTEM

(71) Applicant: SIMPLY AUT LTD., Edmonton (CA)

(72) Inventor: David Stewart, Edmonton (CA)

(73) Assignee: Simply AUT Ltd., Edmonton (CA)

( * ) Notice: Subject to any disclaimer, the term of this patent is extended or adjusted under 35 U.S.C. 154(b) by 265 days.

(21) Appl. No.: 17/920,644

(22) PCT Filed: Apr. 16, 2021

(86) PCT No.: PCT/CA2021/050517
§ 371 (c)(1),
(2) Date: Oct. 21, 2022

(87) PCT Pub. No.: WO2021/212213
PCT Pub. Date: Oct. 28, 2021

(65) Prior Publication Data

US 2023/0142556 A1 May 11, 2023

Related U.S. Application Data

(60) Provisional application No. 63/013,998, filed on Apr. 22, 2020.

(51) Int. Cl.
*G01N 27/82* (2006.01)
*A45C 13/10* (2006.01)

(52) U.S. Cl.
CPC ......... *G01N 27/82* (2013.01); *A45C 13/1069* (2013.01)

(58) Field of Classification Search
CPC ........ G01N 27/00; G01N 27/82; G01N 27/90; G01N 29/00; G01N 29/04; G01N 29/22; G01N 29/24; G01N 29/265; A45C 13/1069
See application file for complete search history.

(56) References Cited

U.S. PATENT DOCUMENTS 314,089 A 3/1885 Westinghouse, Jr.
4,434,660 A 3/1984 Michaels et al.
5,062,301 A * 11/1991 Aleshin ................ G01N 29/265 73/620

(Continued)

FOREIGN PATENT DOCUMENTS

CA 2952152 C * 7/2019 ........... G01N 29/226
CA 3152995 3/2021

(Continued)

OTHER PUBLICATIONS

Machine Translation of CN-111044620 -A (Year: 2020).*

(Continued)

*Primary Examiner* — Nguyen Q. Ha
(74) *Attorney, Agent, or Firm* — Bennett Jones LLP

(57) ABSTRACT

A non-destructive testing (NDT) system which includes a chassis, a NDT scanner which may be an ultrasound scanner, a drive system comprising at least one drive wheel and at least one drive motor, a guidance system operatively connected to the drive system for controlling the motion of the NDT system, and a magnet assembly for adhering the NDT 5 system to a ferromagnetic object, which magnet assembly is configured to be switched on or off as required.

13 Claims, 9 Drawing Sheets

(56) References Cited

U.S. PATENT DOCUMENTS

| | | | | | |
|---|---|---|---|---|---|
| 5,514,956 | A * | 5/1996 | Maxfield | G01N 27/82 | |
| | | | | 324/228 | |
| 8,365,602 | B2 | 2/2013 | Imbert et al. | | |
| 8,590,383 | B2 * | 11/2013 | Brignac | G01N 29/265 | |
| | | | | 73/635 | |
| 8,713,998 | B2 * | 5/2014 | Troy | G01N 29/043 | |
| | | | | 73/104 | |
| 9,003,880 | B2 * | 4/2015 | Sbihli | G01N 27/902 | |
| | | | | 73/488 | |
| 9,759,692 | B2 | 9/2017 | St-Laurent et al. | | |
| 2009/0078484 | A1 | 3/2009 | Kocijan | | |
| 2019/0331620 | A1 * | 10/2019 | Troy | G01S 17/08 | |

FOREIGN PATENT DOCUMENTS

| | | | | | |
|---|---|---|---|---|---|
| CN | 207163974 | | | 3/2018 | |
| CN | 108037177 | | | 8/2018 | |
| CN | 111044620 | A | * | 4/2020 | G01N 29/04 |
| GB | 1559469 | | | 1/1980 | |
| GB | 1559469 | A | * | 1/1980 | G01N 29/11 |
| KR | 20070064730 | A | * | 6/2007 | G01N 29/262 |
| KR | 101628253 | B1 | * | 6/2016 | G01N 29/265 |
| WO | 2017/161326 | | | 9/2017 | |
| WO | 2021/212213 | | | 10/2021 | |

OTHER PUBLICATIONS

Machine Translation of KR-101628253-B1 (Year: 2016).*

Machine Translation of KR-20070064730-A (Year: 2007).*

Magswitch n.d., <https://magswitch.com/>.

Magswitch Cordless Electric Hand Lifter Steel Magnet n.d., Stonex <https://stonex.com.au/products/magswitch-cordless-electric-hand-lifter-magnet>.

Omron. (2016). Colour Mark Sensors [Brochure]. <chrome-extension://efaidnbmnnnibpcajpcglclefindmkaj/https://assets.omron.com/m/5b49e08f6cde2ec0/original/E3S-DC-E3NX-CA-Series-Color-Mark-Sensors-Brochure.pdf>.

Panasonic Industry n.d., <https://na.industrial.panasonic.com/>.

Banner Fiber Optic Photoelectric Sensor, Block Sensor, 60 mm Detection Range n.d., RS Delivers <https://sa.rsdelivers.com/product/banner/banner-fiber-optic-photoelectric-sensor-block-60/8558383>.

SEN0017 Line Tracking Sensor for Arduino V4 n.d., DF Robot <https://wiki.dfrobot.com/Line_Tracking_Sensor_for_Arduino_V4_SKU_SEN0017>.

Me Line Follower Sensor n.d., Makeblock <https://www.makeblock.com/products/sh-me-line-follower-sensor?_pos=1&_psq=line&_ss=e&_v=1.0>.

Werff, D.V. (2018). Passive Localization of Robots with Ambient Light.

CIRC-SCAN Multi-Diameter Non-Ferrous Pipe Weld Scanner n.d., AUT <https://autsolutions.net/ndt-products/ndt-scanners/manual-ndt-ut-scanners/circscan-pipe-weld-scanner/>.

SteerROVER™ Scanner for Weld Inspection and Corrosion Mapping n.d., Olympus <https://www.olympus-ims.com/en/scanners/steerrover/>.

HSMT-Flex n.d., Olympus <https://www.olympus-ims.com/en/scanners/hsmt-flex/>.

Weld Crawler n.d., Zetec <https://www.zetec.com/products/mechanical-systems/scanners/weld-crawler/weld-crawler-benefits/>.

NDT Sweeper n.d., Zetec <https://www.zetec.com/products/mechanical-systems/scanners/ndt-sweeper/>.

Manual Scanner n.d., ISLTE <https://islte.ae/products/jireh/manual-scanner/>.

Pragma n.d., <https://pragmandt.com/>.

Pipe Wizard n.d., Olympus <https://www.olympus-ims.com/en/pipewizard/>.

Force Technology. (n.d.). AGS-2—Automatic General Purpose Scanner [Brochure]. <chrome-extension://efaidnbmnnnibpcajpcglclefindmkaj/https://forcetechnology.com/en/-/media/force-technology-media/pdf-files/0-to-4000/0-to-4000-arkiv/1771-ags-2-automated-general-purpose-scanner>.

Force Technology. (n.d.). AMS-46—Wind Turbine Rotor Blade Scanner [Brochure]. <chrome-extension://efaidnbmnnnibpcajpcglclefindmkaj/https://forcetechnology.com/en/-/media/force-technology-media/pdf-files/0-to-4000/0-to-4000-arkiv/3380-ams46-wind-turbine-rotor-blade-scanner>.

General Electric. (n.d.). Weldstar Hybrid AUT Girth Weld Inspection [Brochure]. <chrome-extension://efaidnbmnnnibpcajpcglclefindmkaj/http://sqsndt.co.in/GEIT-20049EN_weldstar-girth-weld.pdf>.

GY-31 TCS3200 Color Sensor Module n.d., Techtonics <https://www.techtonics.in/gy-31-tcs3200-tcs230-color-sensor-module?search=TCS%203200%20COLOR&description=true>.

Atkinson, D. (Jun. 2022). Examiner's Report CA 3,152,995.

Atkinson, D. (Jan. 2023). Examiner's Report CA 3,152,995.

Atkinson, D. (Aug. 2023). Examiner's Report CA 3,152,995.

* cited by examiner

Magnetic Flux Path

Serial flux confined within the assembly – active shunting

Leakage-free flux path. Concentrated flux density

MAGNETIC ULTRASOUND TESTING SYSTEM

CROSS-REFERENCE TO RELATED APPLICATION

This application claims priority to U.S. Provisional Application Ser. No. 63/013,998, filed Apr. 22, 2020, entitled "MAGNETIC ULTRASOUND TESTING SYSTEM", which is incorporated by reference herein in its entirety, where permitted.

FIELD OF THE INVENTION

The present invention relates generally to methods and systems for non-destructive testing inspection, and in particular, ultrasonic testing inspection of pipeline welds.

BACKGROUND

Non-destructive testing (NDT) is a technique used by industry to evaluate the properties of a material, component, structure, or system for characteristic differences or welding defects and discontinuities, without causing damage to the original part. NDT methods may include electromagnetic testing, radar testing, laser testing, microwave testing, and acoustic emission testing. Ultrasonic testing is a form of acoustic testing based on the propagation of ultrasonic waves in the object or material being tested.

It is well known to perform automated ultrasound testing of pipeline girth welds with conventional devices that use ultrasound scanners mounted to a metal band which passes around the pipeline circumference. However, these bands are inconvenient and expensive.

There is a need in the art for an automated NDT system which at least eliminates the need for a physical guide on the object being tested.

SUMMARY OF THE INVENTION

In general terms, the invention comprises a non-destructive testing (NDT) scanning device which magnetically attaches to a test object, and comprises a motion control system to guide itself along the test object. The test object may have a curved, irregular or flat surface. In one preferred embodiment, the test object comprises a pipe having a circumferential girth weld.

Therefore, in one aspect, the invention may comprise a NDT system for testing a ferromagnetic object, the NDT system comprising:

(a) a chassis;
(b) a NDT scanner;
(c) a drive system comprising at least one drive wheel and at least one drive motor;
(d) a guidance system operatively connected to the drive system for controlling the motion of the NDT system; and
(e) at least one magnet assembly for adhering the NDT system to the ferromagnetic object, which magnet assembly is configured to be selectively activated or deactivated" to vary the strength of an external magnetic field of the magnet assembly at the object.

In another aspect, the invention may comprise a method of NDT of a ferromagnetic object, comprising:

(a) magnetically attaching a portable NDT system to the object by activating a magnet assembly on the NDT system;
(b) scanning the object or a portion of the object with an NDT scanner aboard the NDT system, while the NDT system guides itself with a guidance system of the NDT system, and optionally propels itself along the object; and
(c) magnetically detaching the NDT system from the object by deactivating the magnet assembly.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1A:
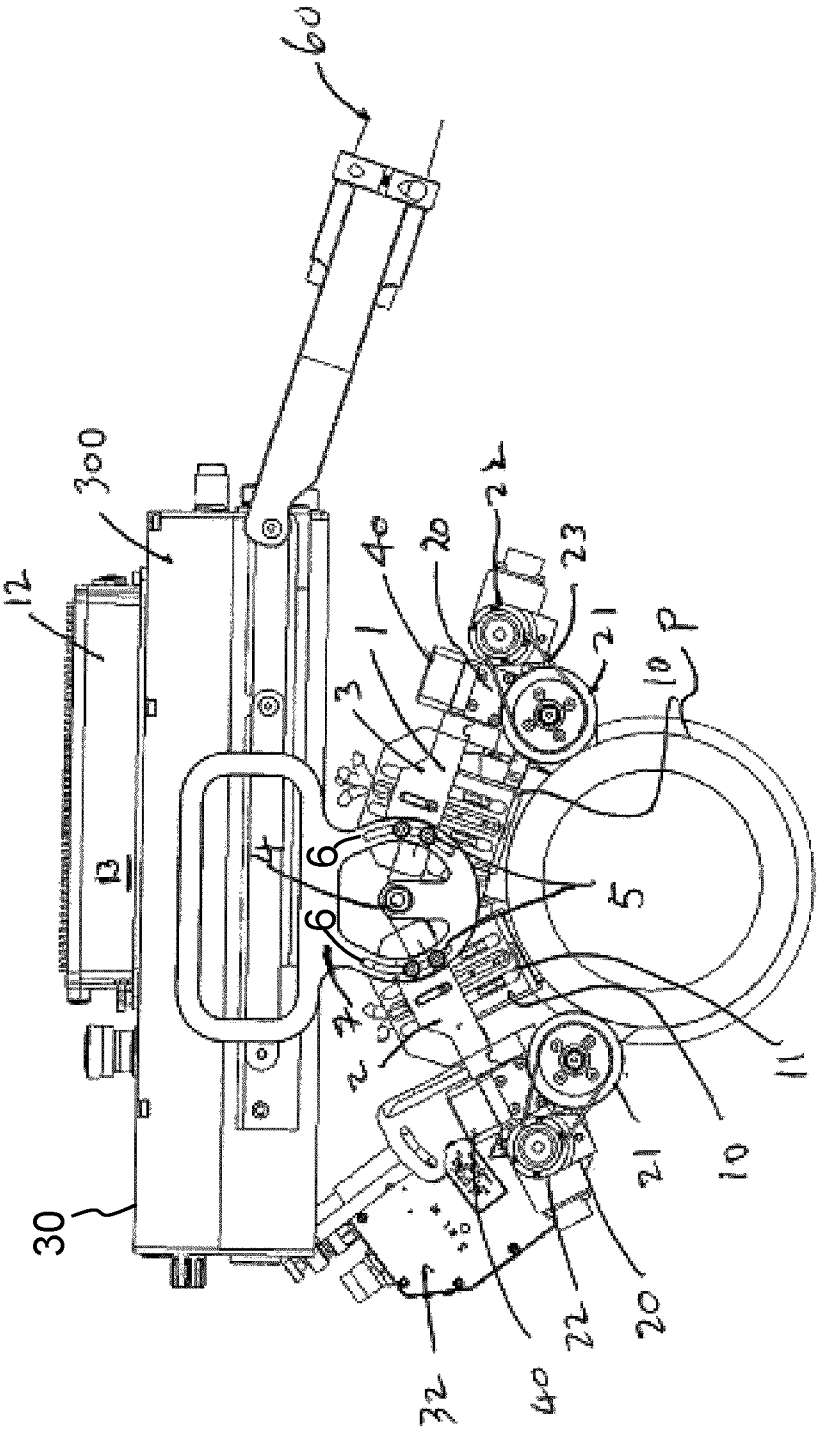
FIG. 1A is a schematic side view of some embodiments of a NDT system (device) of the present invention, attached to a small diameter pipe (seen in cross-section).

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described or illustrated, and of being practiced and carried out in various ways. Also, it is to be understood that the phraseology and terminology employed in this specification are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. Furthermore, the claims should be regarded as including such equivalent constructions insofar as they do not depart from the spirit and scope of the present disclosure.

All terms not specifically defined herein have their common, art-accepted meanings, in the context of non-destructive testing. As used herein, the following terms have the following meanings.

“NDT scanner” refers to a device that allows for evaluation of the properties of a test object for characteristic differences, defects or discontinuities, without causing damage to the test object. In embodiments, “NDT scanner” may include a transducer for generating electromagnetic, radar, laser, microwave, or acoustic (including ultrasound) emissions at the test object, and sensors and processors for detecting and analyzing emissions reflected by the test object to determine a characteristic of the test object. NDT scanners are well known to those skilled in the art, and further description is not necessary.

“Computing device”, “processor”, and like terms refer to one or more electronic devices capable of performing operations on data. Non-limiting examples of computer devices include devices referred commonly referred to as processors, servers, general purpose computers, personal computers, desktop computers, laptop computers, handheld computers, smart phones, tablet computers, and the like. Any kind of computer device adapted for carrying out the methods described herein may be used.

“Memory” refers to a non-transitory tangible computer-readable medium for storing information in a format readable by a processor, and/or instructions readable by a processor to implement an algorithm. The term “memory” includes a plurality of physically discrete, operatively connected devices despite use of the term in the singular. Non-limiting types of memory include solid-state, optical, and magnetic computer readable media. Memory may be non-volatile or volatile. Instructions stored by a memory may be based on a plurality of programming languages known in the art, with non-limiting examples including the C, C++, Python™, MATLAB™, and Java™ programming languages.

Figure 1B:
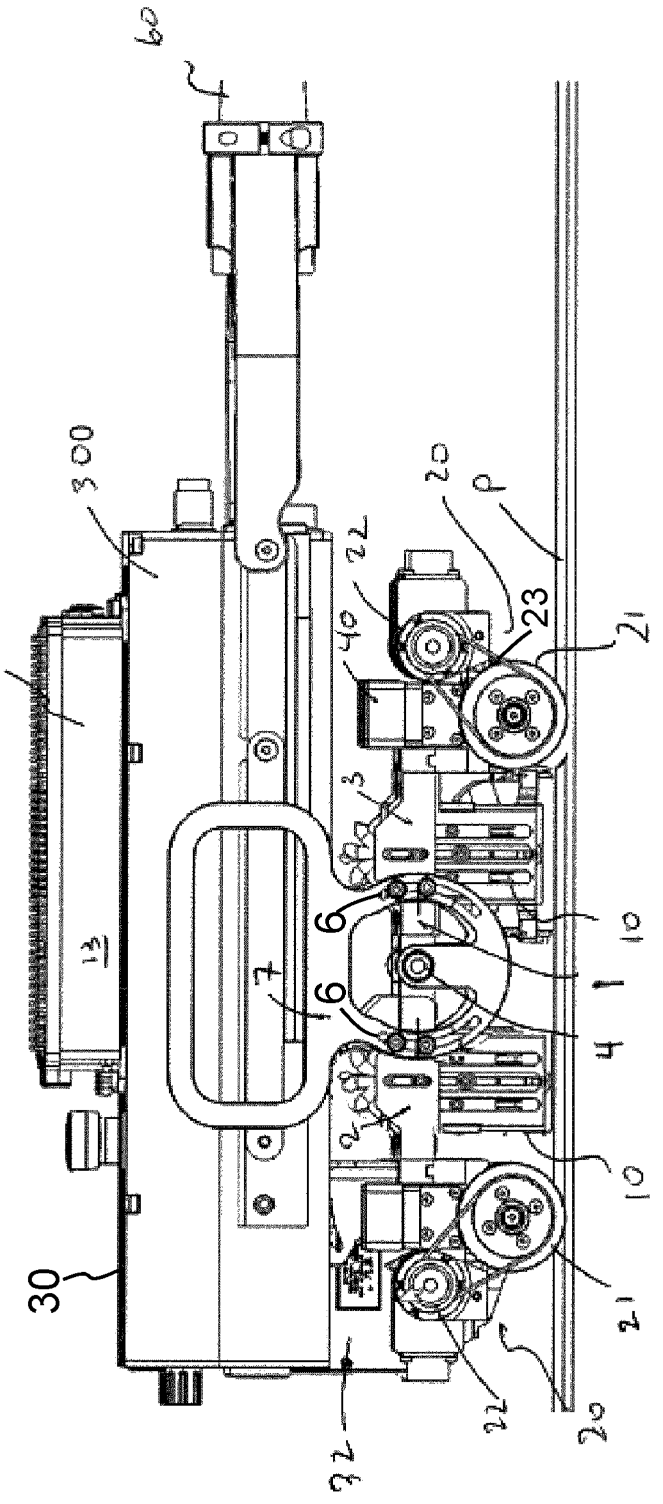
FIG. 1B is a side view of the same embodiment of the device of FIG. 1A, attached to a flat object.

FIG. 1A shows one embodiment of an NDT system, which is referred to herein as the “device”. The device is attached to a test object, which in this case is a small diameter pipe (P). Although this invention is not limited to scale, the illustrated pipe (P) has a diameter of 4". Embodiments of the device may be used on test objects with any degree of surface curvature, such as larger diameter pipes, an irregular surface, a flat surface (as shown in FIG. 1B) or even a concave surface.

The device is configured to be magnetically mounted to the test object by a variable magnet system, which can be switched on or off, in order to attach or remove the device. In some embodiments, the device is self-propelled and autonomously drives itself over the test object by means of a guidance system, which comprises a motion control system and a drive system.

In some embodiments, as shown in the Figures, the device comprises a frame or chassis (1) upon which the components are mounted, which include an NDT scanner (10) and a guidance system comprising a drive system (20) and a motion control system (30). A magnet assembly (40) controls magnetic attachment of the device to the test object. In some embodiments, the chassis comprises a fore subframe (2) and a rear subframe (3), which are hingedly connected about a central transverse pivot (4). Guide pins (5) mounted to each subframe (2, 3) follow slots (6) formed in a tie bar (7). As may be seen in FIGS. 1A and 1B, this hinged configuration permits the device to be used on smaller diameter pipes (FIG. 1A) as well as larger diameter pipes, flat surfaces (FIG. 2) or even concave surfaces (bowls).

The NDT scanner (10) may comprise any conventional testing components, which are commercially available, and well known to those skilled in the art. In some embodiments, the NDT scanner (10) comprises an acoustic ultrasound testing system which comprises at least one ultrasound transducer (11) and an electronic component (12). The ultrasound system may comprise a plurality of different transducers in order to provide a full suite of testing data. For example, the NDT scanner (10) may use a combination of full matrix capture (FMC) transducers, a monoelement conventional transverse transducers, and/or steerable phased array transducers.

In alternative embodiments, the NDT scanner (10) may comprise an eddy current electromagnetic test system, or an electro-magnetic-acoustic transducer (EMAT) test system, which are well known in the art.

The NDT scanner (10) may comprise an electronic component (12) to control ultrasound beam forming by an ultrasound transducer (11), and to process the reflected ultrasound signals, such as a printed circuit board (PCB) housed in an enclosure (13). Alternatively, a processor (101) may be configured to execute the functions of the ultrasound beam forming PCB. For example, referring to FIG. 7, a processor (101) may communicate with a memory (103) that stores computer-executable instructions, such that processor (101) may then execute these instructions. As another example, the functions of the processor (101) may be included in processor (101) itself, such that processor (101) is configured to implement these functions.

The drive system (20) comprises at least one drive wheel (21) and drive motor (22), and in preferred embodiments, comprises a plurality of drive wheels (21) and drive motors (22). The drive wheels (21) are in contact with the test object, while the drive motors (22) may be simple small DC motors. With a plurality of drive wheels (21) and drive motors (22), the device may be steered by differential speeds of the drive wheels (21). Alternatively, at least one drive wheel (21) may be pivoted about a steering axis to steer the device.

Figure 2:
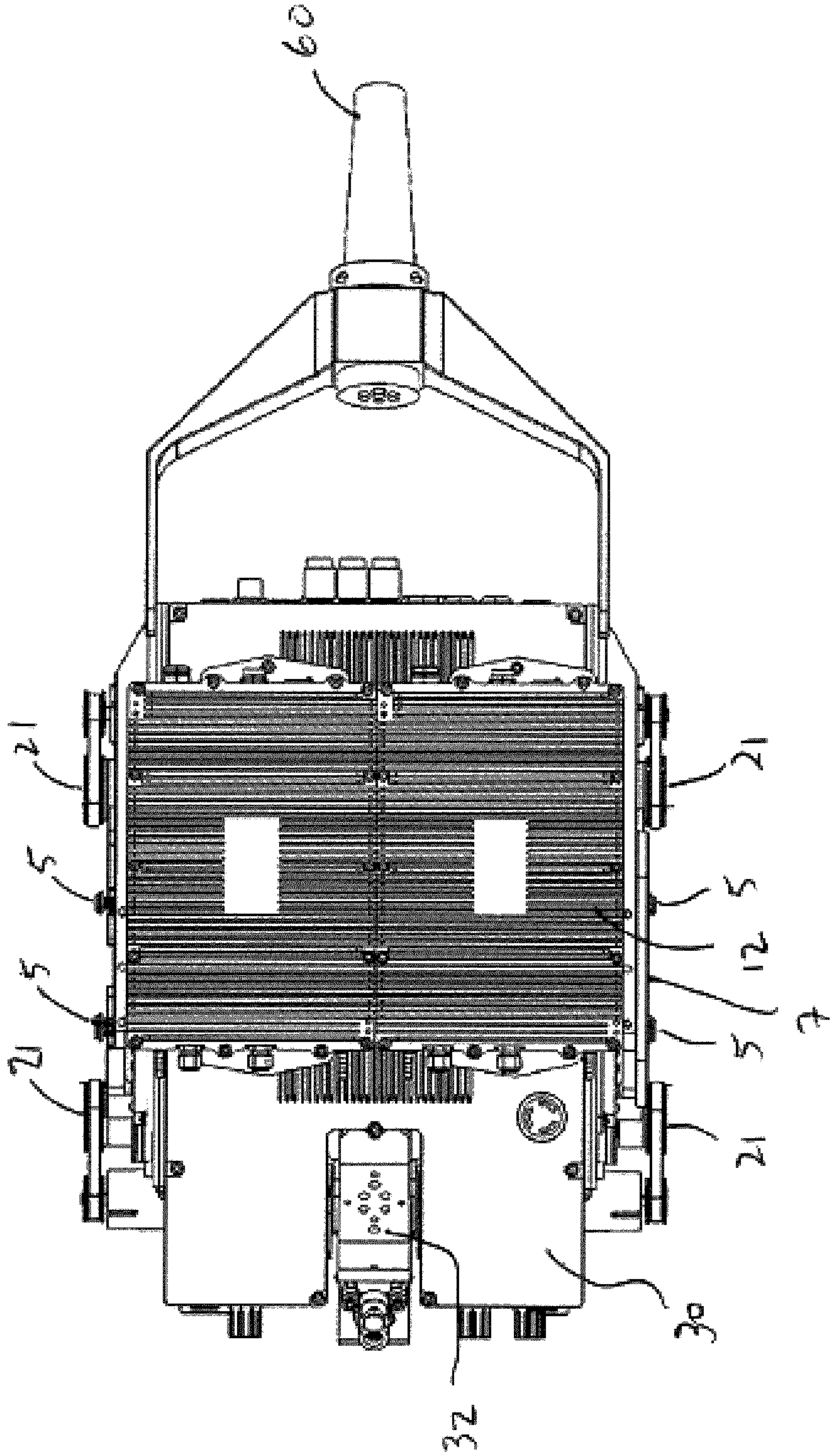
FIG. 2 is a top plan view of the embodiment of the device of FIGS. 1A and 1B.

In some embodiments, such as shown in FIG. 2, the drive system (20) comprises four drive pods (one drive pod being shown in FIG. 3C) mounted on or adjacent the four corners of the subframes (2,3). Each drive pod comprises a drive motor (22), at least one and preferably a pair of drive wheels (21). The drive motor (22) may directly drive the drive wheels (21), or may utilize a drive belt (23) (see FIG. 1A).

Figure 3A:
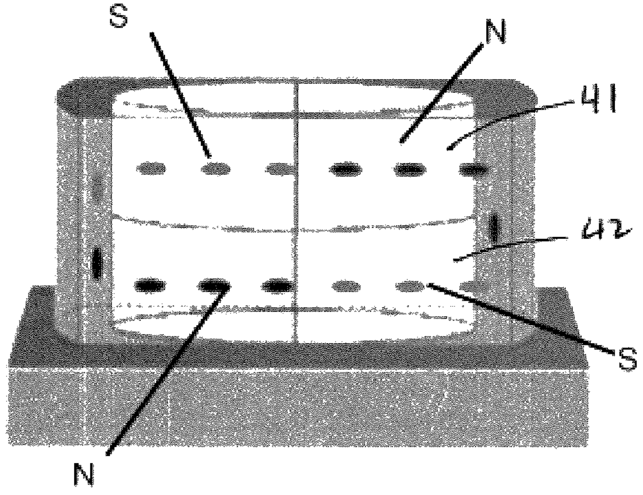
FIG. 3A shows a schematic depiction of the switchable magnet assembly of some embodiments of the device, when the poles of two permanent magnets are out of alignment.
Figure 3B:
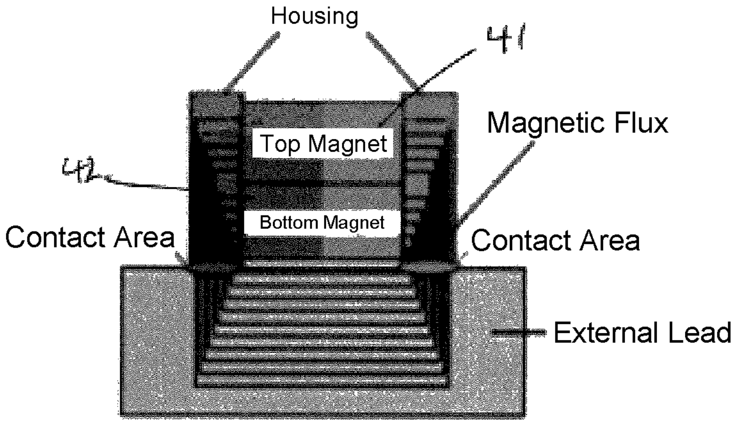
FIG. 3B shows a schematic depiction of the switchable magnet assembly of some embodiments of the device, when the poles of two permanent magnets are in alignment.
Figure 3C:
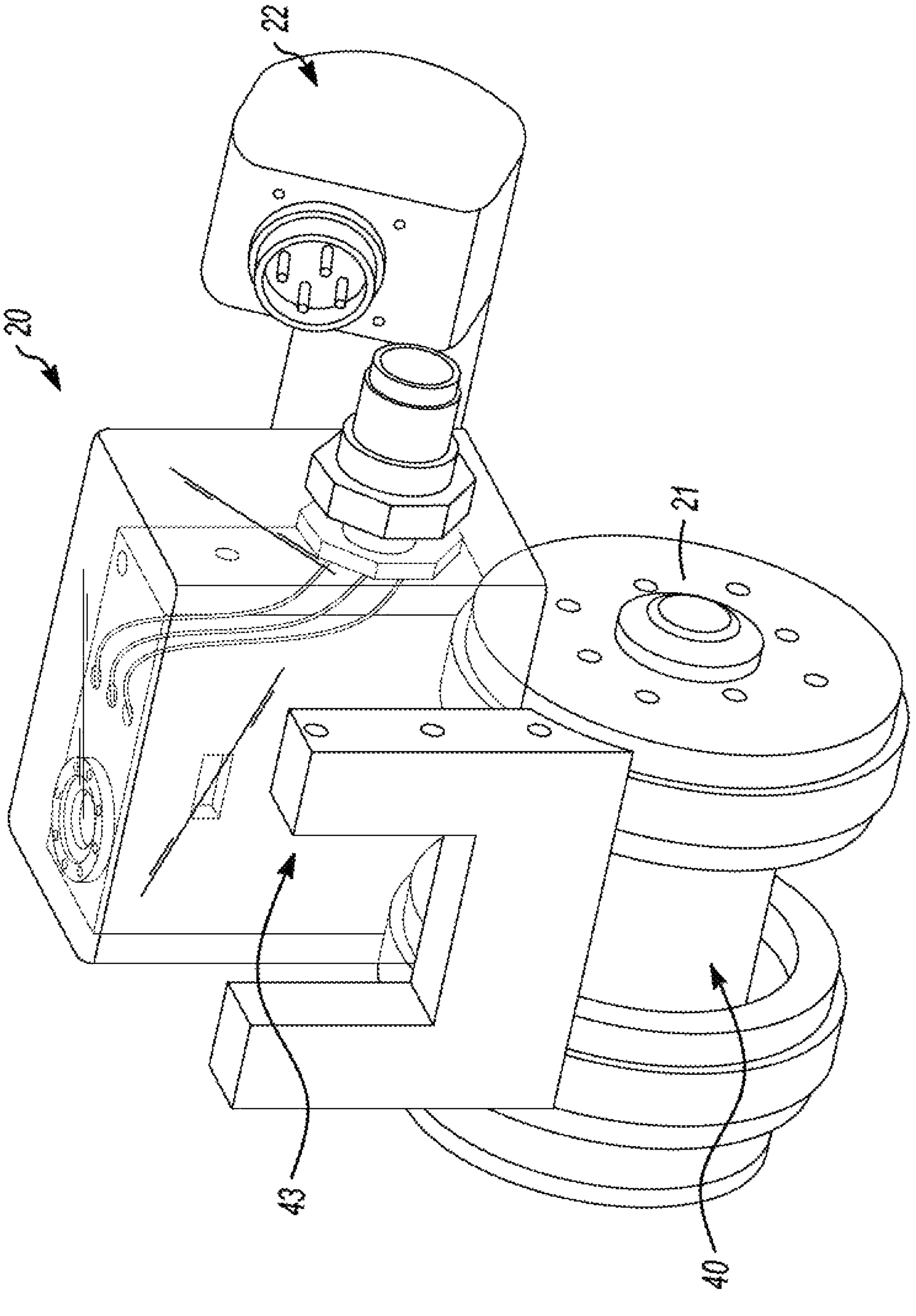
FIG. 3C shows a schematic depiction of a drive pod including the switchable magnet assembly shown in FIG. 3B.

In some embodiments, as shown in FIG. 3C, each drive pod further comprises the magnet assembly (40), which is configured to be selectively activated or deactivated (or switched “on” or “off”) to magnetically attach or detach, respectively the device to a ferromagnetic test object by varying a strength of an external magnetic field of the magnet assembly (40) at object. For example, in some embodiments, the magnet may be an electromagnet with a current switch for controlling current flow to the electromagnet, or the magnet may be shielded with a moveable shield, with the magnet being considered to be activated or switched “on” when unshielded from the test object, and deactivated or switched “off” when shielded from the test object to weaken the external electromagnetic field of the magnet assembly (40) at the test object. In alternative embodiments, the magnet assembly (40) may be separated from the drive components.

In some embodiments, as shown in FIGS. 3A and 3B, the magnet assembly (40) comprises two cylindrical permanent magnets (41, 42) which are rotatable relative to each other. In a first configuration, where the poles of the two magnets (41, 42) are out of alignment, as is shown schematically in FIG. 3A, the magnetic flux of the magnet assembly (40) is actively shunted within the magnet assembly (40) which is thus deactivated, and the external magnetic field is weakened significantly. However, when the magnets (41, 42) are rotated such that the poles are aligned, the magnetic field is projected outward of the magnet assembly (40), as is shown in FIG. 3B, and the magnet assembly is thus activated. An exemplary implementation is shown in FIG. 3C. A servo motor (43) is configured to rotate the upper magnet (41) in order to control the magnetic flux of the magnet assembly (40). The servo motor (43) is controlled by a simple on/off switch (not shown) which may be manually operated, or may be controlled by a computer controller.

In some embodiments, the magnet assembly (40) is associated with the drive wheels (21) in a drive pod. When the magnets (41, 42) are activated, the drive wheels (21) become magnetized and will attach to a ferromagnetic object. In some embodiments, the magnets (41, 42) are oriented such that the magnetic flux is directed through one drive wheel (21), into the object, and back into the other drive wheel (21). This configuration greatly increases the magnetic attraction of the magnet assembly (40) to the test object.

Figure 4:
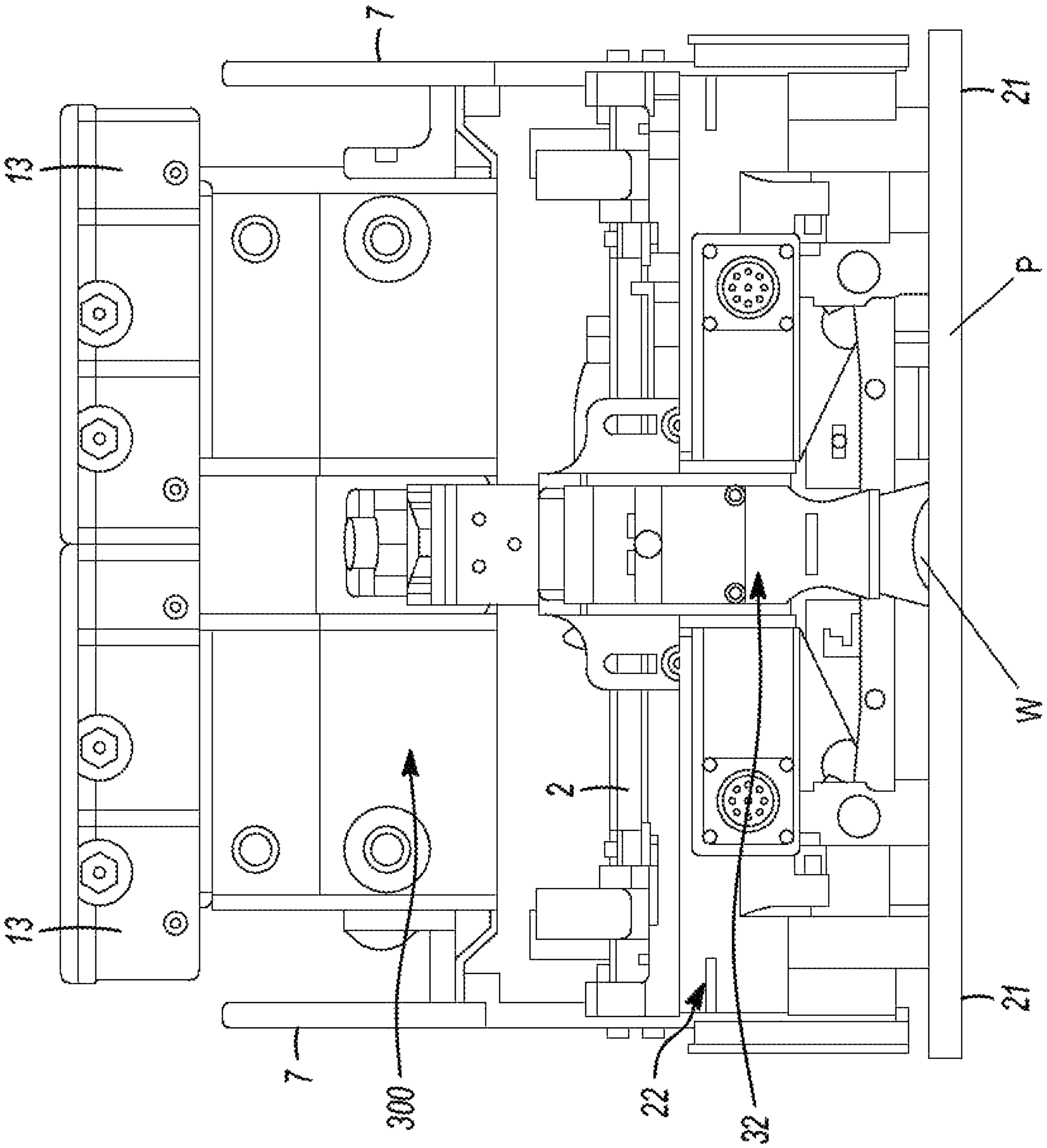
FIG. 4 is a front view of the embodiment of the device of FIG. 1A.

The motion control system (30) comprises a guidance system which maps or controls the path of the device and sends speed and/or directional signals to the drive system (20). The guidance system may be configured to avoid obstacles, follow a pre-programmed path, follow a guide feature, allow manual control, or some combination thereof. In some embodiments, as shown in FIG. 4, the guidance system comprises a two- or three-dimensional laser (LiDAR) encoder (32) or scanner, which may measure a two-dimensional profile, or a three-dimensional topography of the test object. For example, where the test object comprises a girth weld between two lengths of pipe, the laser scanner may be configured to oscillate back and forth across the weld cap (W), which will have a raised profile. Thus the LiDAR encoder (32) can determine if the device is substantially centered on the weld cap (W), as may be seen schematically in FIG. 4. LiDAR encoders or scanners are well known to those skilled in the art, and further description is not necessary.

The LiDAR system produces data such as a point cloud, which can be used by the guidance system to guide the direction of the device, such as by using the data to steer the drive system (20) to follow a weld cap (W) or other surface feature of the test object which is detectable by the LiDAR encoder.

Figure 5:
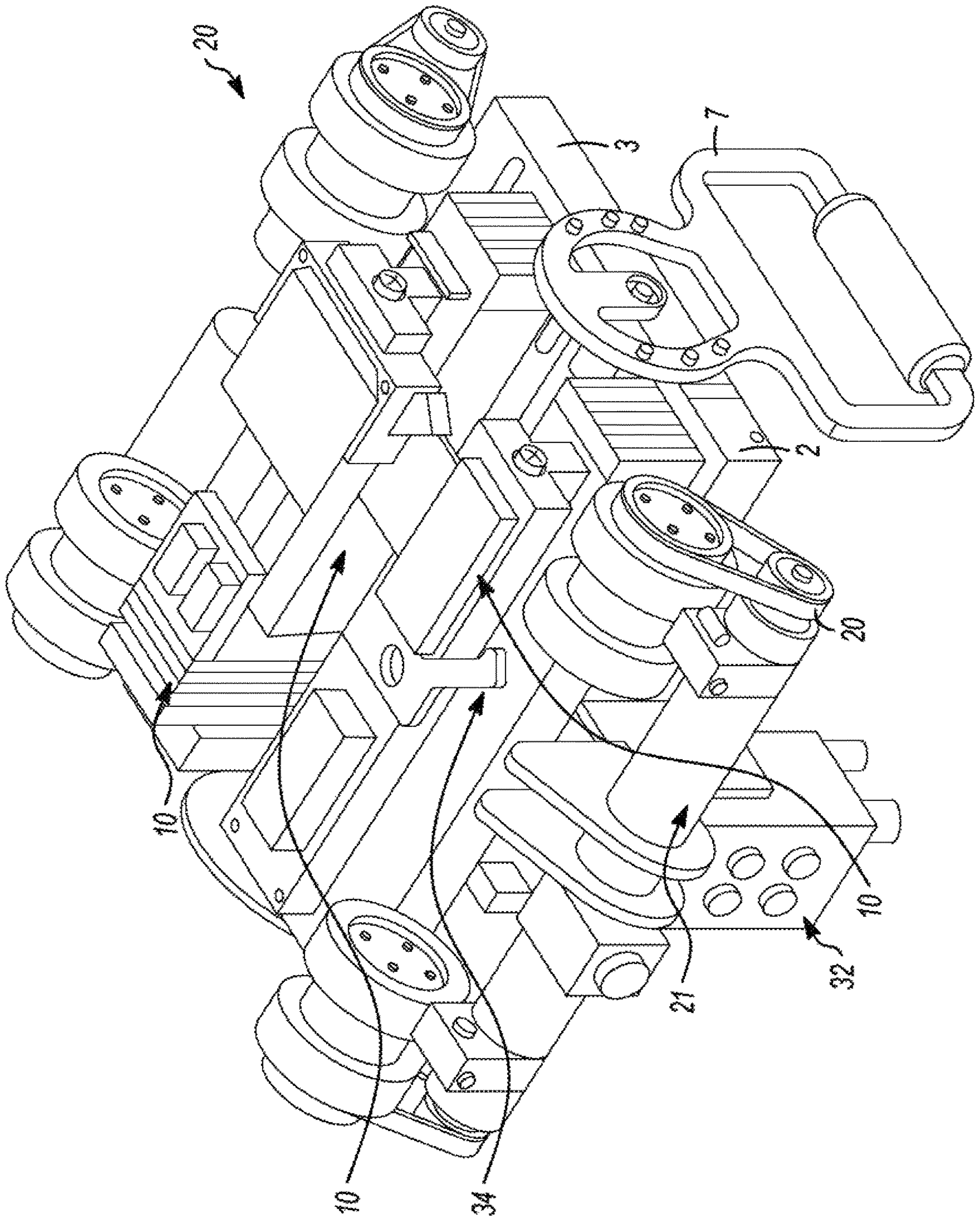
FIG. 5 is a bottom perspective view of the embodiment of the device of FIG. 1A, with certain components omitted for clarity.

In some embodiments, as shown in FIG. 5, the motion control system (30) further comprises an optical sensor (34) for detecting a visible mark. For example, the optical sensor (34) may be implemented with an RGB sensor to detect a start/stop mark on a test object.

In some embodiments, the device comprises an encoder wheel (35) in contact with the test object and a rotary encoder which measures rotation, which permits determination of distance travelled by the device. Alternatively, a shaft encoder could be positioned on one of the drive wheels (21).

Figure 6:
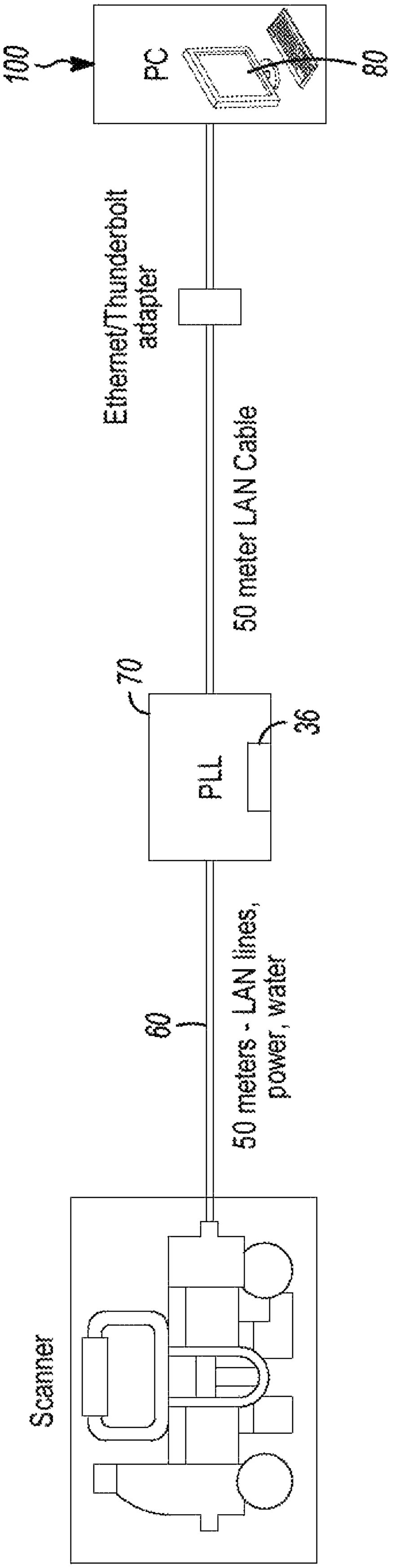
FIG. 6 is a schematic depiction of some embodiments of a NDT system (device) of the present invention, including a power supply and a computer controller.

In some embodiments, the drive system (20) electronics and the guidance system electronics are provided on a commercially available 4-axis motion control printed circuit board or processor, housed in a motion control module (300), mounted to the chassis (1). Referring to FIG. 6, a LiDAR circuit board (36) or processor drives the LiDAR encoder (32), receives the LiDAR output, and produces the laser point cloud data. The circuit board (36) or processor may conveniently be provided remotely, in a separate module on the device, or in the motion control module (300). In alternative embodiments, the electronic components of any or all of the drive system (20), the guidance system, or the LiDAR encoder (32) may be provided remotely and connected to the device by a wired or wireless connection.

As shown in FIG. 6, power and data connection to the device may be provided by an umbilical cord (60) which connects to a power module (70) and a computer (80). The umbilical cord (60) may also include water hoses connecting to a water supply, which may be necessary to provide the liquid interface required for contact ultrasound transducers (11). In some embodiments, the umbilical cord (60) connects to a power module (70) which also houses the LiDAR circuit board (36). The power module (70) may, for example, comprise a 48V power supply from an AC/DC transformer. Further voltage step downs may be accomplished with power modules on board the device itself to provide 12V, 5.5V, or 3.3V as required by the different components. Inductance chokes may be provided as necessary, as is known to those skilled in the art.

Data and control signals may be passed back and forth to the device and the computer (80) by conventional networking protocols and connections, such as Ethernet. In alternative embodiments, data and control signals may be transmitted to and from the device by wireless communications, such as by WiFi, Bluetooth, or cellular data connections.

Figure 7:
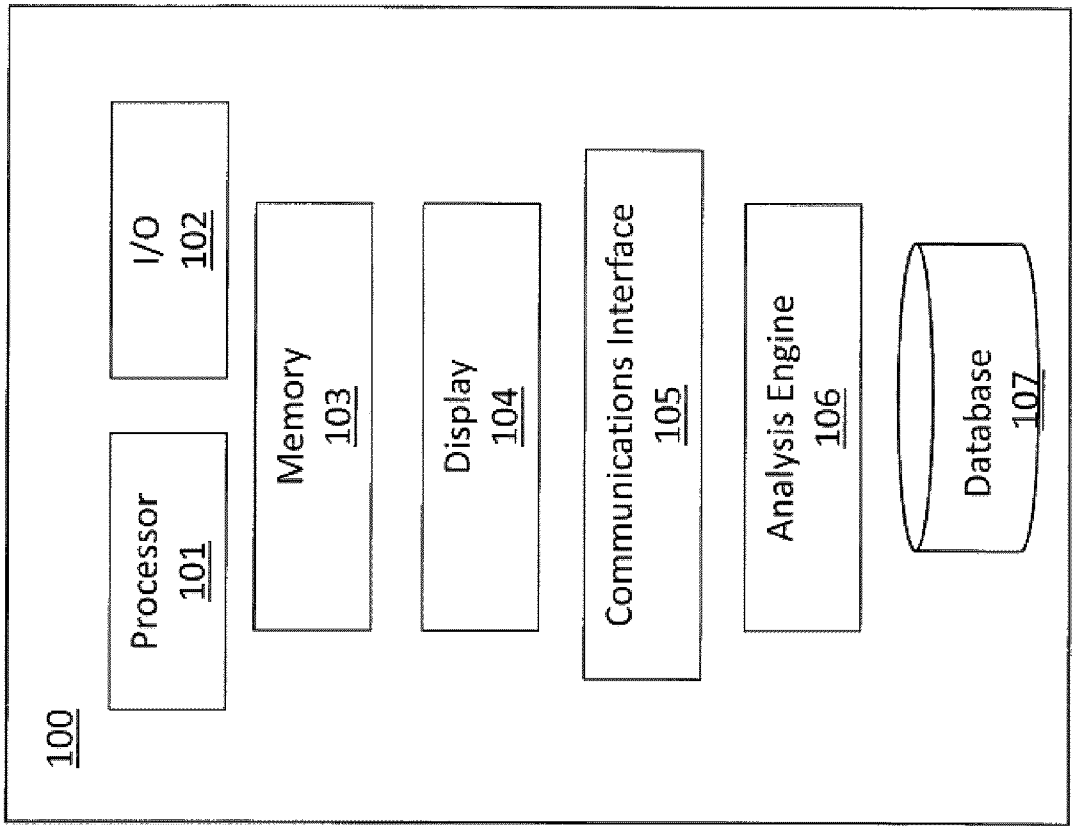
FIG. 7 is a schematic depiction of a computing system of some embodiments of the NDT system (device) of the present invention.

The computer (80) may run software which operates the device, by controlling the NDT scanner (10) and collecting the test data, and, optionally, controlling the motion control system (30) and drive systems (20). As shown in FIG. 7, computer system (100) may be representative of the computer (80). The computer system (100) may include one or more processors (101) for executing instructions. Processors suitable for the execution of instructions include, by way of example, both general and special purpose microprocessors, and any one or more processors of any kind of digital computer. Computer system (100) may also include one or more input/output (I/O) devices (102), which may include physical keyboards, virtual touch-screen keyboards, mice, joysticks, styluses, etc. Moreover, I/O devices (102) may include loudspeakers, handset speakers, microphones, cameras, or sensors such as accelerometers, temperature sensors, or photo/light sensors.

As further illustrated in FIG. 7, computer system (100) may include one or more storage devices configured to store data and/or software instructions used by the one or more processors (101) to perform operations consistent with disclosed aspects and embodiments herein. For example, computer system (100) may include a memory (103) configured to store one or more software programs that is executed by the one or more processors (101) to perform functions or operations. By way of example, memory (103) may include NOR or NAND flash memory devices, Read Only Memory (ROM) devices, Random Access Memory (RAM) devices, etc. Memory (103) may also include storage mediums such as, for example, hard drives, solid state drives, tape drives, RAID arrays, etc. Although FIG. 7 shows only one memory (103), system may include any number of memories. Further, although FIG. 7 shows memory (103) as part of system (100), memory (103) may be located remotely and system (100) may be able to access memory (103) via a network.

Computer system (100) may also include one or more displays (104) for displaying data and information. Display (104) may be implemented using devices or technology, such as a cathode ray tube (CRT) display, a liquid crystal display (LCD), a plasma display, a light emitting diode (LED) display, a touch screen type display such as capacitive or resistive touchscreens, and/or any other type of display known in the art.

Computer system (100) may also include one or more communications interfaces (105). Communications interface (105) may allow software and data to be transferred between computing device (80) and the scanning device, as well as remote computers or servers. Examples of communications interface (105) may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Communications interface (105) may transfer software and data in the form of signals, which may be electronic, electromagnetic, optical, or other signals capable of being received by communications interface (105). These signals may be provided to communications interface (105) via a communications path (not shown), which may be implemented using wireless, wire, cable, fiber optics, radio frequency ("RF") link, and/or other communications channels.

Computer system (100) may include an analysis engine (106). By way of example, analysis engine (106) may be configured to summarize and manipulate the NDT data in accordance with known NDT protocols and methods. In some embodiments, analysis engine (106) may be implemented as at least one hardware module configured to execute the functions described herein. Alternatively, processor (101) may be configured to execute the functions of the analysis engine (106). For example, processor (101) may communicate with memory (103) that includes components of the analysis engine (106) in the form of computer-executable instructions, such that processor (101) may then execute these instructions. As another example, the functions of the analysis engine may be included in processor (101) itself, such that processor (101) is configured to implement these functions.

Database (107) may be used to store data from the NDT testing process, and any associated data, such as test object identification, time, geolocation, and the like.

In some embodiments, the processor (101) may be configured to execute the functions of the ultrasound beam forming PCB, the motion control system (30) PCB, and/or the LiDAR circuit board (36), or any other of the electronics required for the components described above.

One exemplary operation of the device is to inspect a girth weld (W) on a pipeline (P) as shown in FIG. 4. The operation is initiated by placing the device on the pipeline (P), such that the laser scanner of LiDAR encoder (32) is approximately above the weld cap (W), and the device is facing the intended direction of travel. The magnet servo motors (43) are activated and the device magnetically adheres to the pipe (P). A signal indicating activation of the magnets (41, 42) is sent to the computer (80), which then initiates startup of the ultrasound electronics and the motion guidance system (30) including the RGB optical sensor (34). The device moves forward by actuation of the drive motors (22) until the RGB optical sensor (34) detects a datum line, which is simply a mark on or beside the weld cap (W). The device stops and the user is presented with an interface associated with the computer (80) to start the scan, and to save data generated by the scan to a chosen location. The device then resets the encoder wheel (35) and operates to scan the weld cap (W) with the ultrasound components. As the LiDAR scanner (i.e., LiDAR encoder (32) and LiDAR circuit board (36)) scans the weld cap (W), the guidance system provide directions to the drive system (20) to move the device forward in a direction following the weld cap (W) by aligning the device to the center of the weld cap (W).

The device will continue moving forward and scanning until it has travelled a predetermined distance as determined by the encoder wheel (35), or the RGB sensor (34) detects the datum line, which indicates the device has travelled completely around the circumference of the pipe (P). In some embodiments, the predetermined distance may be slightly longer than the circumference of the pipe (P), or the device may scan some distance beyond the datum line, to ensure the entire weld (W) has been inspected. The scan data file is then closed and stored, automatically or with user inputs. Once the acquired data is deemed acceptable and safely stored, the device may then be removed by deactivating the magnet system (20).

Exemplary Aspects

In view of the described devices, systems, and methods and variations thereof, certain more particularly described aspects of the invention are presented below. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A non-destructive testing (NDT) system for testing a ferromagnetic object, the system comprising: (a) a chassis; (b) a NDT scanner; (c) a drive system comprising at least one drive wheel and at least one drive motor; (d) a guidance system operatively connected to the drive system for controlling the motion of the NDT system; and (e) at least one magnet assembly for adhering the NDT system to the ferromagnetic object, which magnet assembly is configured to be selectively switched "on" or "off" to vary a strength of an external magnetic field of the magnet assembly at the object.

Aspect 2: The system of Aspect 1 wherein the NDT scanner is an ultrasound scanner comprising an ultrasound transducer.

Aspect 3: The system of Aspect 1 or 2, wherein the guidance system comprises a LiDAR scanner configured to identify a profile of a surface of the object, which profile is used by the guidance system to control the drive system to steer the NDT system while magnetically attached to the object.

Aspect 4: The system of Aspect 3 wherein the LiDAR scanner is configured to identify the profile of a weld cap as the object.

Aspect 5: The system of any one of Aspects 1 to 4, wherein the magnet assembly comprises a pair of cylindrical permanent magnets configured such that rotation of one magnet relative to the other causes the magnet assembly to either shunt magnetic flux within the magnet assembly to weaken an external magnetic field and thereby switch "off" the magnet assembly, or direct a magnetic flux path into the object and thereby switch "on" the magnet assembly.

Aspect 6: The system of any one of Aspects 1 to 5, wherein the at least one drive wheel is magnetizable, and the magnet assembly is associated with the at least one drive wheel such that the at least one drive wheel is magnetized when the magnet assembly is switched "on".

Aspect 7: The system of any one of Aspects 1 to 6 wherein the guidance system further comprises an optical scanner for detecting a visible mark.

Aspect 8: The system of any one of Aspects 1 to 7 further comprising an encoder wheel for determining a distance travelled by the NDT system when driven by the drive system.

Aspect 9: The system of any one of Aspects 1 to 8 wherein the chassis is hinged about an axis transverse to the forward direction of travel of the NDT system when driven by the drive system.

Aspect 10: The system of any one of Aspects 1 to 9 wherein the drive system comprises four drive pods, each positioned on a corner of the chassis, wherein each pod comprises one of the at least one drive motor and one of the at least one drive wheel, and wherein each pod includes one of the at least one magnet assembly for magnetizing the one of the at least one drive wheel.

Aspect 11: A method of non-destructive testing (NDT) a ferromagnetic object, comprising: (a) magnetically attaching a portable NDT system to the object by switching "on" a magnet assembly on the NDT system; (b) scanning the object or a portion of the object with an NDT scanner aboard the NDT system, while the NDT system guides itself along the object with a guidance system of the NDT system; and (c) magnetically detaching the NDT system from the object by switching "off" the magnet assembly.

Aspect 12: The method of Aspect 11 wherein the NDT system, using a drive system of the NDT system, propels itself along the object while scanning the object.

Aspect 13: The method of any one of Aspects 11 to 12 wherein the guidance system comprises a LiDAR scanner configured to identify a surface feature of the object and the guidance system is configured to follow the surface feature.

Aspect 14: The method of Aspect 13 wherein the object is a pipe and the surface feature is a weld cap.

Definitions and Interpretation

Aspects of the present invention may be described with reference to flowchart illustrations and/or block diagrams of methods, apparatus (systems), modules and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

References in the specification to "some embodiments", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically.

What is claimed is:

1. A non-destructive testing (NDT) system for testing a ferromagnetic object, the NDT system comprising:

(a) a chassis;

(b) an NDT scanner;

(c) a drive system comprising at least one drive wheel and at least one drive motor;

(d) a guidance system operatively connected to the drive system to facilitate control of the motion of the NDT system; and (e) at least one magnet assembly for adhering the NDT system to the ferromagnetic object, which magnet assembly is configured to be selectively activated or deactivated to vary a strength of an external magnetic field of the magnet assembly at the object, wherein the guidance system comprises a LiDAR scanner configured to identify a profile of a surface of the object, which profile is used by the guidance system to control the drive system to steer the NDT system while magnetically attached to the object.

2. The system of claim 1, wherein the NDT scanner is an ultrasound scanner comprising an ultrasound transducer.

3. The system of claim 1, wherein the LiDAR scanner is configured to identify the profile of a weld cap as the object.

4. The system of claim 1, wherein the magnet assembly comprises a pair of cylindrical permanent magnets configured such that rotation of one magnet relative to the other causes the magnet assembly to either shunt magnetic flux within the magnet assembly to weaken an external magnetic field and thereby deactivate the magnet assembly, or direct a magnetic flux path into the object and thereby activate the magnet assembly.

5. The system of claim 1, wherein the at least one drive wheel is magnetizable, and the magnet assembly is associated with the at least one drive wheel such that the at least one drive wheel is magnetized when the magnet assembly is activated.

6. The system of claim 1, wherein the guidance system further comprises an optical scanner for detecting a visible mark.

7. The system of claim 1, further comprising an encoder wheel for determining a distance travelled by the NDT system when driven by the drive system.

8. The system of claim 1, wherein the chassis is hinged about an axis transverse to the forward direction of travel of the NDT system when driven by the drive system.

9. The system of claim 1, wherein the drive system comprises four drive pods, each positioned on a corner of the chassis, wherein each pod comprises one of the at least one drive motor and one of the at least one drive wheel, and wherein each pod includes one of the at least one magnet assembly for magnetizing the one of the at least one drive wheel.

10. The system of claim 1, wherein the guidance system operates in a manner selected from the group consisting of: avoid obstacles, follow a pre-programmed path, follow a guide feature, and manual control of the guidance system.

11. A method of non-destructive testing (NDT) a ferromagnetic object, comprising:

(a) magnetically attaching a portable NDT system to the object by activating a magnet assembly on the NDT system;

(b) scanning the object or a portion of the object with an NDT scanner aboard the NDT system, while the NDT system guides itself along the object with a guidance system of the NDT system, wherein the guidance system comprises a LiDAR scanner configured to identify a surface feature of the object and the guidance system is configured to follow the surface feature; and (c) magnetically detaching the NDT system from the object by deactivating the magnet assembly.

12. The method of claim 11, wherein the NDT system, using a drive system of the NDT system, propels itself along the object while scanning the object.

13. The method of claim 11, wherein the object is a pipe and the surface feature is a weld cap.

* * * * *